United States Patent
Grayver

(10) Patent No.: US 7,321,989 B2
(45) Date of Patent: Jan. 22, 2008

(54) SIMULTANEOUSLY MULTITHREADED PROCESSING AND SINGLE EVENT FAILURE DETECTION METHOD

(75) Inventor: Eugene Grayver, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 618 days.

(21) Appl. No.: 11/029,706

(22) Filed: Jan. 5, 2005

(65) Prior Publication Data

US 2006/0150186 A1    Jul. 6, 2006

(51) Int. Cl.
*G06F 11/00*    (2006.01)
(52) U.S. Cl. ........................................................ 714/38
(58) Field of Classification Search ................... 714/38
See application file for complete search history.

(56) References Cited

U.S. PATENT DOCUMENTS

| 7,200,822 | B1* | 4/2007 | McElvain ...................... 716/3 |
| 2001/0034854 | A1* | 10/2001 | Mukherjee ...................... 714/5 |
| 2002/0133751 | A1* | 9/2002 | Nair et al ...................... 714/38 |
| 2005/0050387 | A1* | 3/2005 | Mariani et al. ................ 714/13 |
| 2006/0095821 | A1* | 5/2006 | Mukherjee et al. ......... 714/736 |
| 2006/0156123 | A1* | 7/2006 | Mukherjee et al. ......... 714/727 |

\* cited by examiner

*Primary Examiner*—Bryce P Bonzo
(74) *Attorney, Agent, or Firm*—Derrick Michael Reid

(57) ABSTRACT

A multithreaded processor is programmed for executing multiple simultaneous working programs by respective processor worker threads each executing the identical code having identical results for achieving redundant operations that can be compared to each other by one or more checker threads for determining when one of the working programs or checker threads has failed for a single event fault detection and recovery of a failed worker or checker monitoring program so as to mitigate the effects of single event failure that may be due to radiation.

10 Claims, 1 Drawing Sheet

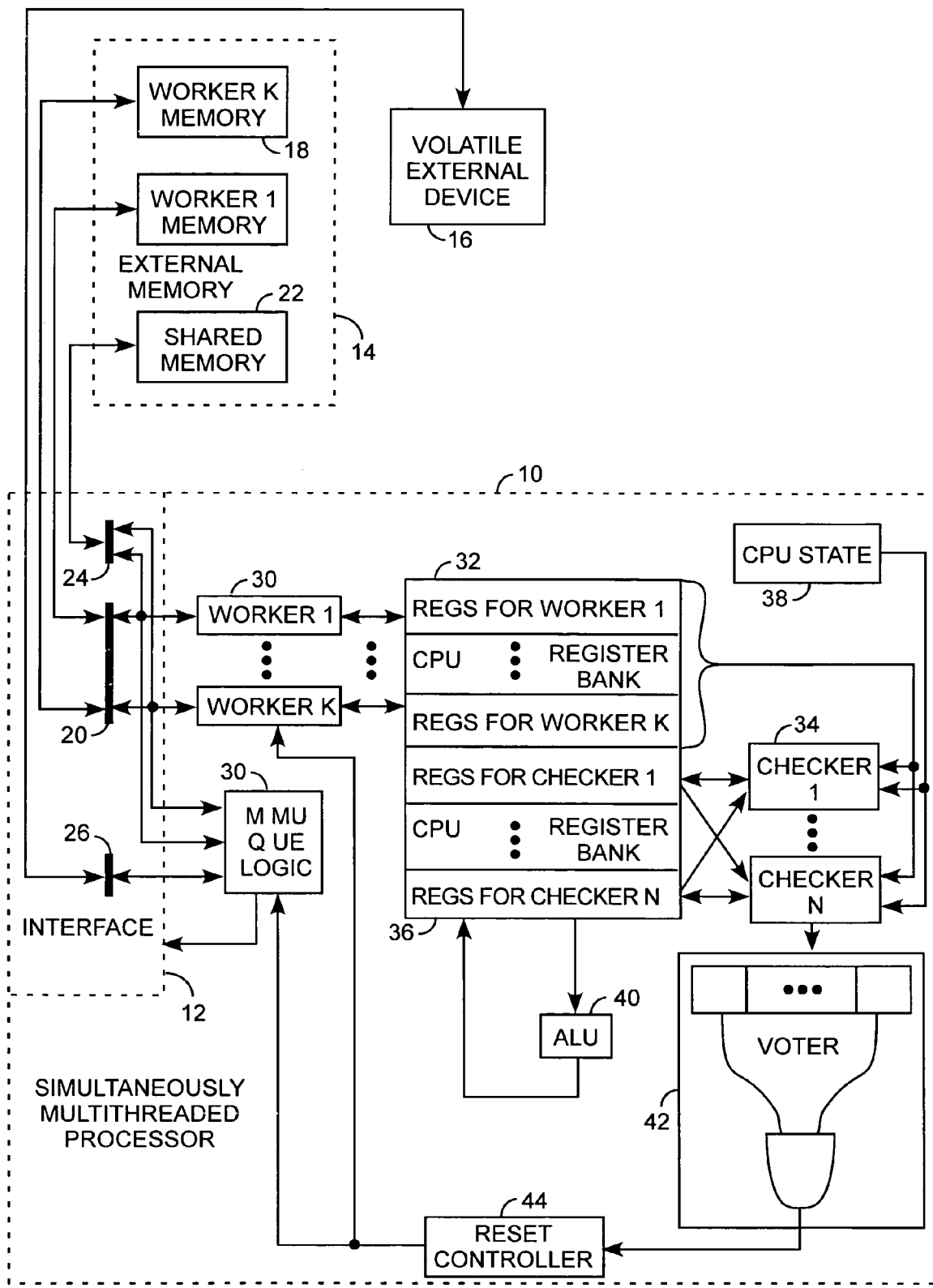

SIMULTANEOUSLY MULTITHREADED PROCESSING AND SINGLE EVENT FAILURE DETECTION METHOD

FIELD OF THE INVENTION

The invention relates to the field of concurrent parallel processing of like programs, processor voting for determining failed processes, and multithreaded processors. More particularly, the present invention relates to methods implemented by multithreaded processors for concurrent execution of like programs and monitoring for voting and detecting of single event failures.

BACKGROUND OF THE INVENTION

Radiation can affect the operation of electronic devices. Digital circuits operating in a high radiation environment, such as in space, are susceptible to single event effects by radiation exposure. For example, a high-energy particle can cause the state of a digital storage register, or an input to a digital gate, to a change state. This change in state can result in a single event failure of the design, but is not usually destructive. Many systems and processes have been designed and used to overcome the problem of radiation exposure. The different approaches can be grouped into two areas. The semiconductor processes are modified with radiation hardened process modifications such that single event failures are minimized. The use of radiation-hardened processes is costly and time-consuming to implement. Radiation hardened processes typically lag the state-of-the-art commercial processes by almost a decade at times. The solution of semiconductor process modification is known as radiation-hardened by process. A system can also be designed such that single event failures are firstly detected and the effects of single event failures are fixed by program control. The program control solution to single event failures is known as radiation-hardened by design.

Previous designs, that provide radiation-hardened by design fault detection of and recovery from single-event failures, have leveraged redundancy. For example, three identical working processors are integrated on a single board. Each processor is made to execute identical code. An external circuit monitors relevant outputs of the working processors operating synchronously. The external circuit is often made radiation-hardened by process. When one of the working processors undergoes a single event failure, its outputs will differ from the remaining two working processors that are functioning normally. In that case, the monitor circuit can reset the faulty processor and restart the processor to enter the same state of the two remaining working processors. The probability of two working processors, or three working processors will undergo a single event failure simultaneously is very low. This radiation-hardened by design approach is known as triple majority voting. Majority voting redundancy has been used and demonstrated to mitigate single-event failures on single-board computers.

There are a number of difficulties with the triple majority voting technique. Only the external working processor outputs are observable. A single event failure may take a long time to manifest itself externally to be then observable. Also, the monitor circuit has to be redesigned for every new working processor used. The expense is incurred both during the design phase and more importantly in the fabrication of a new set of chips. The monitor circuit typically lacks an ability to access data registers within the working processors so as to determine the internal states of the working processors, making it difficult to quickly reset the working processor to a good working state. Furthermore, additional pins often have to be brought out of the working processor to simplify the monitoring operation. This increase in output pins increases the power consumption.

Conventional single-fault detection systems have used separate respective processors for each working program. In the event of a failure, a monitoring processor checks the result of each of the working processors to determine that each of the working processors have the same current state for indicating that all of the working processors are functioning correctly. When any one of the working processors has a state different than the remaining working processors. The monitoring processor determines which one of the working processors has failed. The monitoring processor determines a failure typically through the voting process. The failed working processor can be restarted and reset to the state of the remaining working processors so as to keep all of the working processors in the same state, while identifying and recovering from single event failures. The monitoring processor is typically a radiation-hardened monitoring processor. By so doing, these working processors can recover from single event failures such as those that randomly occur through radiation exposure. As such, a single-fault detection and correction system is a radiation-hardened system.

The Multithreaded processors are a new class of processors that have been used for transient fault recovery. The application of simultaneously multithreaded processors is for fault recovery for terrestrial based highly reliable servers. Operational processors are now equipped with multithreading processing. Hardware multithreading increases the performance of a processor, such as a system processor, a microprocessor, or a digital signal processor, without increasing the operating frequency. The code compiled for multithreaded processors can explicitly schedule different instructions for different program threads. Multithreaded processors are now commercially available. They offer very high performance and low price and leverage the leading edge commercial fabrication processes. A typical example of a hardware multithreaded digital signal processor is one made by Sandbridge Technologies. Multithreaded processors have been used to execute multiple different program threads for improved performance of a single operation processor. However, the advantages of increased performance and the ability to concurrently execute many different program threads renders the multithreaded processor susceptible to single event failures. These and other disadvantages are solved or reduced using the invention.

SUMMARY OF THE INVENTION

An object of the invention is to provide a method for determining when one working program among several identical working programs has failed.

Another object of the invention is to provide a method for determining when one working program among several identical working programs has failed by comparing results of all of the working programs executing identical code.

Yet another object of the invention is to provide a method through implementation by a multithreaded processor for determining when one working program among several identical working programs has failed by comparing results of all of the working programs executing identical code.

Still another object of the invention is to provide a method through implementation by a multithreaded processor, for determining when one working program among several identical working programs has failed by comparing results of all of the working programs executing identical code for a single failure fault identification.

The invention is directed to the application of single event failure radiation-hardened by design to multithreaded processors. Preferably, the multithreaded processors use majority voting redundancy to monitor the operation of identical working program threads within the multithreaded processors. Simultaneous multithreading processor design combines hardware multithreading with superscalar processor technology to allow multiple threads to issue instructions during each cycle. Multiple threads are disposed inside a single processor. A multithreaded processor would preferably have at least four supported program threads, at least three working program threads and at least one monitor thread. In this simplest case, the three worker program threads are set to execute the same program code that affect a respective set of output registers. The fourth program thread is designated as the monitor thread. When more than four threads are available, or when more single fault detection and protection is desired, additional program threads can be used for worker processing and for monitor processing. Additional monitoring threads can be effective because some monitoring processes may be required to determine when any one of the monitoring program threads has experienced a single event failure. Hence, it is desirable for the monitoring threads to be programmed to know, a priori, which registers will be accessed by which working threads and monitoring threads, at which time. A compiler can extract this information when the worker and monitor program threads are compiled. As such, the multithreaded processor can be preprogrammed to implement a method used to perform single event failure detection of any one of several identical working program threads, all synchronously on a single processor chip.

The method has a number of advantages. Chief among these advantages is a board-level single event failure solution that is a software-only solution with an internal processor monitor program. The monitor threads executing inside the processor can readily and comprehensively access to the state of the output registers of the data working program threads. Thus, single event failures can be quickly detected internal to the processor. The overall power consumption is reduced because the data register signals to be monitored are all internal to the processor. The method leverages the multithreaded processor design for single event fault detection and recovery in a stand alone solution. The method does not require any special processes and is applicable to commercial multithreaded processor designs with increased performance and decreased costs. The method can be extended to all forms of processing units that support explicit hardware redundancy, including the adaptive computing machines. The method is applicable to any design that requires signal processing or control in a radiation environment. These and other advantages will become more apparent from the following detailed description of the preferred embodiment.

BRIEF DESCRIPTION OF THE DRAWINGS

The drawing is a block diagram of a simultaneous multithreaded processor executing K worker threads that are monitored by N checkers for processor voting for determining when any one of the K worker thread has failed.

DETAILED DESCRIPTION OF THE PREFERRED EMBODIMENT

An embodiment of the invention is described with reference to the figures using reference designations as shown in the drawing. Referring to the drawing, a simultaneously multithreaded processor 10 preferably includes an interface 12 for communicating data to external devices, such as, an external memory 14 and a volatile external device. The processor 10 is preferably a single semiconductor chip. The method is described based on a tight coupling presentation of a software and hardware mix implemented by the multithreaded processor 10. The external memory 14 includes K worker memories 18 transceiving worker data communicated through a worker bus 20 of the interface 12. The external memory 14 may also include shared memory 22 transceiving shared data through a shared bus 24 of the interface 12. The volatile external device 16 transceives auxiliary data through an auxiliary bus 26 of the interface 12. The interface 12 is controlled by a memory management unit (MMU) 28 having que logic for effective I/O communications to the external devices 14 and 16. The MMU 28 is a complex unit responsible for managing thread access to external memory resources 14 and 16. The MMU 28 provides fine-grained access control to both internal cache memory, not shown, and external memories 14 and 16, on a per-thread basis. As such, a memory segment can be set to be inaccessible by a thread, have read-only access, have write-only access, or have read-write access. The MMU 28 includes a read-writable set of registers, not shown. External interface 12 provides the physical path to off-chip memory 14 and devices 16. The interface 12 is controlled by a MMU 28. The external memory 14 and device 16 are accessed by the interface 12 that is used for external communications. The access control through the interface 12 is managed by the MMU 28. The external memory 14 is a memory pool that may be divided into sections, such as worker memory 18 and share memory 22. The MMU 28 preferably has exclusive read-write access to the volatile external device 16, that maybe for example, an external hard drive.

The multithreaded processor 10 includes a plurality of threads. The term thread is applied to both the programs executed and the respective dedicated hardware necessary to execute the programs. Program threads and hardware threads are collectively referred to simply as threads. The multithreaded processor 10 includes at least four threads, including K worker threads accessing a worker register bank 32 and including N checker threads 34 accessing a checker register bank 36. The checker threads 34 are effectively monitor threads that monitor the operation of the worker threads 30. Each of the worker threads 30 preferably have exclusive respective read-write access to the external worker memories 18, and all of the worker thread 20 preferably have access to the external shared memory 22. Each of the worker threads 32 has a set of associated worker registers in the worker register bank 32. Each of the checker threads 32 have a set of associated checker registers in the checker register bank 36. The checker threads 34 will preferably access central processing unit (CPU) state data 38 for purposes of monitoring the worker threads 30. An arithmetic logic unit (ALU) 40 is used to perform necessary operations to execute the worker threads including reading and storing data in the register banks 36. The ALU 40 provides effective data paths for processed data into and out of the register banks 32 and 36. The ALU 40 implements standard arithmetic and logic operations. The ALU 40 is a shared resource among all the threads 30 and 34.

A voter 42 is used to compare results of the checker threads 34, and when necessary, activates a reset controller 44 to reset any one of or all of the worker threads 30 to a known desired state. The fault voting logic of the voter 42 is responsible for identifying a fault condition and triggering appropriate recovery sequence. The voter 42 can be implemented off-chip using standard logic gates, but is preferably implemented internal to the processor 10. The reset controller may further serve to reset the checker threads 34. While shown to have K worker threads 30 and N checker threads 34, the processor 10 includes at least three worker threads 30 and at least one checker thread 34. In the case of only one checker thread 34, and hence, only one monitoring vote, such that, the voter 42 may not used, but rather, the one checker thread 34 directly activates the reset controller 44.

Each worker thread 30 has a set of registers in the worker register bank 32 that is divided into groups or sets. There are a total of K worker threads 30 where K is greater than two. The worker threads 30 are allocated for executing respective desired identical worker programs. That is, these worker threads execute identical code. Each of the worker threads 30 is preferably allotted exclusive read-write access to an identical number of worker registers in the worker register bank 32. There is a total number of N checker threads 34 where N is greater than zero. The checker threads 34 are allocated to software that verifies correct operation of the worker threads 30. These checker threads are also referred to as monitor threads. Each of the checker threads 34 is preferably allocated exclusive read-write access to an identical number of associated registers in the checker register bank 36. Likewise, each checker thread 34 has a set of registers in the checker register bank 36. That is, each of the banks 32 and 36 that is divided into groups or sets for respective threads 30 and 34. Each thread is given conditional access to a set of associated registers. A hardware access protection unit, not shown, may be responsible for assuring the proper access control of the threads 30 and 34 to the register banks 32 and 36. However, preferably, the checker threads 34 have read only access to the worker register bank 32. The worker threads 30 can preferably only access worker register bank 32. The checker threads 34 have read and write access to the checker register bank 36. For monitoring the operation of the worker threads 30, each of checker threads 30 is allocated non-exclusive read access to the entire CPU register bank including banks 32 and 36, as well as the CPU state 38 that indicates processor operational status.

The multithreaded processor 10 can execute multiple instruction streams, that is, program threads in parallel using some shared hardware resources, and hence the use of the term thread, as each thread is not an entire processor, but includes only that respective thread hardware necessary. As such, all of the program threads 30 and 34 are executed on a single processor chip. These threads should be compiled such that each program thread uses a unique subset of available registers of the banks 32 and 36. This access constraint assures that only one program thread is affected when a register changes state. The checker threads 34 are given read-only access to all the registers to perfect the monitoring function. The monitor threads 30 can quickly and efficiently compare the worker registers of the bank 32 belonging to different worker threads 30 to determine when one of the worker threads has experienced an upset, that is, a single event failure.

Some external accesses may be volatile, such as those to and from the volatile external device 16. That is, successive reads from the same address of the volatile external device may not return identical values. An example of such a volatile read would be the current time of day. Even though the worker threads 30 execute essentially in parallel inside the processor 10, the external accesses may be sequential. Likewise, an external volatile device 16 may respond differently to multiple writes of the same data to the same location. Either of these conditions can cause the internal state of the worker threads 30 to diverge. The method relies on the worker threads 30 operating identically at all times. Therefore, the volatile accesses to the volatile external device may be handled differently. The MMU 28 is responsible for buffering volatile reads and only accessing the external hardware on the first of a sequence of K successive reads. Likewise, only the first of a sequence of K writes is executed.

In the case of a single checker thread where N=1, the method provides that this checker thread monitor the worker register bank 32 to determine that all of the worker threads 30 are in the same state. When one of the worker threads 30 is different that the remaining ones of the worker treads, then the checker threads communicates the same and different status to the voter 42 that detects a different status and activates the reset controller 44 to reset the differing worker thread to the same state as the remaining worker threads. In the case of multiple checker threads 34, where N is greater than one, each of the checker threads 34 send different and same status to the voter 42 that detects a different status and activates the reset controller 44 to reset the differing worker thread to the same state as the remaining worker threads. In both case, the method act to vote on the correct status. As the method is directed to a single event failure, only one of the worker threads would have a different status that the remaining workers threads having a same status. As such, the checker thread 30 and voter 42 implements a fault voting function. When there are multiple checker threads, when N is greater than one, the checker effectively vote amongst themselves as to which one of the worker threads has failed or which one of the checker threads has failed. That is, the method detects not only when one of the worker threads has a different status amongst the worker threads, but also detects when one the checker thread 34 has a different status. Thus, the method detects single event failures of either a worker thread or a checker thread. Redundant checker threads are desirable to reduce the probability of a checker thread undergoing an undetected fault. Each of the checker threads 34 set a fault bit in an array 46 of Nx(K+N) bits for one of the K worker threads. A hardware logical AND function can implement the majority vote function to declare a thread fault and triggers appropriate recovery action by the reset controller. In addition to verifying the worker threads 30, each of the checker threads 34 also verifies any one of the checker threads. The self-verification may be limited to verifying that the software code has not been corrupted.

The invention is directed to a single event failure detection method implemented in a simultaneously multithreaded processor where at least three worker threads execute the identical code providing output status that is monitored by at least one checker thread. When one of the worker threads is different than the remaining same worker treads, a single event failure has been detected and the different thread can be reset to the state as the remaining same worker thread. Optionally, a plurality of the checker threads can be used for not only checking for single event failure of the worker threads but also for checking for single event failures of the checker threads, preferably by majority voting, resulting in a reset and recover function. Those skilled in the art can make enhancements, improvements, and modifications to the invention, and these enhancements, improvements, and modifications may nonetheless fall within the spirit and scope of the following claims.

What is claimed is:

1. A method implemented by a program executed by and within a programmed simultaneously multithreaded processor for detecting a single event failure, the method comprising the steps of, executing like worker programs by respective worker threads of the processor, storing respective results from the execution of the like worker programs, executing a monitoring program by a checker thread of the processor for comparing the stored respective results, and determining when a result of the results of a respective worker threads is different than remaining results of remaining worker threads for detecting that a respective worker thread has had a single event failure.

2. The method of claim 1 wherein, the number of worker threads is three or more.

3. The method of claim 1 further comprising the steps of, storing the results in respective sets of registers, and reading the results by the monitoring program.

4. The method of claim 1 further comprising the steps of, communicating over an interface like data from and to each to worker threads.

5. The method of claim 1 further comprising the steps of, reading external data over an interface from a volatile memory, and synchronizing the external data to be like data communicated to the worker threads.

6. A method implemented by a program executed by and within a programmed simultaneously multithreaded processor for detecting a single event failure, the method comprising the steps of, executing like worker programs by respective worker threads of the processor, storing respective worker results from the execution of the like worker programs, executing like monitoring programs by checker threads of the processor for comparing the stored respective worker results, and determining when one of the worker results is different than remaining worker results of remaining worker threads for detecting when a respective worker thread has had a single event failure.

7. The method of claim 6 wherein, the number of worker threads is greater than two.

8. The method of claim 6 wherein, the number of checker threads is greater than two.

9. The method of claim 6 further comprising the steps of, storing respective checker thread results from the execution of the like monitoring programs, and voting among the checker threads for determining when a checker thread result is different from remaining checker results for detecting that a respective checker thread has failed.

10. The method of claim 6 further comprising the steps of, reading external data over an interface from a volatile memory, and synchronizing the external data to be like data communicated to the worker threads.

* * * * *